United States Patent
Gehrlein

(10) Patent No.: US 11,307,155 B2
(45) Date of Patent: Apr. 19, 2022

(54) DEVICE FOR ADJUSTING AND EXCHANGING BEAMSTOPS

(71) Applicant: Bruker AXS GmbH, Karlsruhe (DE)

(72) Inventor: Wolfgang Gehrlein, Ruelzheim (DE)

(*) Notice: Subject to any disclaimer, the term of this patent is extended or adjusted under 35 U.S.C. 154(b) by 91 days.

(21) Appl. No.: 16/905,099

(22) Filed: Jun. 18, 2020

(65) Prior Publication Data
US 2020/0400592 A1 Dec. 24, 2020

(30) Foreign Application Priority Data

Jun. 18, 2019 (DE) .......................... 102019208834.1

(51) Int. Cl.
| | | |
|---|---|---|
| *G01N 23/201* | (2018.01) | |
| *G01N 23/207* | (2018.01) | |
| *G21K 1/10* | (2006.01) | |
| *G01N 23/20008* | (2018.01) | |

(52) U.S. Cl.
CPC ......... *G01N 23/201* (2013.01); *G01N 23/207* (2013.01); *G01N 23/20008* (2013.01); *G21K 1/10* (2013.01); *G01N 2223/321* (2013.01)

(58) Field of Classification Search
CPC ........... G01N 23/201; G01N 23/20008; G01N 23/207; G01N 23/2073; G01N 2223/321; G21K 1/10
See application file for complete search history.

(56) References Cited

U.S. PATENT DOCUMENTS

| | | | |
|---|---|---|---|
| 5,604,353 A | * | 2/1997 | Gibson ............... G21K 1/06 250/505.1 |
| 7,295,650 B2 | | 11/2007 | Lange et al. |
| 9,562,865 B2 | | 2/2017 | Schnablegger et al. |
| 10,429,326 B2 | | 10/2019 | Hoffman et al. |

(Continued)

FOREIGN PATENT DOCUMENTS

| | | |
|---|---|---|
| DE | 102006029449 B3 | 9/2007 |
| DE | 102013112736 A1 | 6/2014 |

(Continued)

OTHER PUBLICATIONS

Kim et al.—KR 10-1608669—Google Patents English obtained Nov. 3, 2021 (Year: 2021).*

(Continued)

*Primary Examiner* — David P Porta
*Assistant Examiner* — Jeremy S Valentiner
(74) *Attorney, Agent, or Firm* — Benoit & Côté Inc.

(57) ABSTRACT

A beamstop arrangement for an x-ray-optical system is adjustable in an xy plane perpendicular to a z-direction for optimizing a ratio of useful radiation reaching a surface to interfering radiation of an x-ray beam in the z-direction. The beamstop arrangement comprises a plurality of beamstops of differing size and/or geometry arranged on an exchanging mount, which is installed on a carriage displaceable in the xy plane by means of a drive unit having at least one positioning motor. The multiple beamstops can be located in a vacuum, while the drive motors and all electronic compo- (Continued)

nents can be positioned outside the vacuum, so that no heat development takes place in the measurement region. Corruption of the measurement result due to a changed measurement background is thus avoided.

17 Claims, 6 Drawing Sheets

(56) References Cited

U.S. PATENT DOCUMENTS

| | | | |
|---|---|---|---|
| 2004/0206908 A1 | 10/2004 | Lange et al. | |
| 2007/0007464 A1* | 1/2007 | Lange | G01N 23/201 250/390.1 |
| 2008/0175352 A1* | 7/2008 | Kogan | G01N 23/201 378/81 |
| 2014/0151569 A1* | 6/2014 | Schnablegger | G01N 23/20 250/390.02 |

FOREIGN PATENT DOCUMENTS

| | | | |
|---|---|---|---|
| EP | 1024356 A2 | 8/2000 | |
| EP | 3441981 A1 | 2/2019 | |
| ES | 2599628 A1 | 2/2017 | |
| KR | 101608669 B1 * | 4/2016 | G01N 23/201 |
| KR | 101608669 B1 | 4/2016 | |
| WO | 9642088 A1 | 12/1996 | |

OTHER PUBLICATIONS

LCLS: "Engineering Specification Document (ESD) R0 LUSI SUBSYSTEM XCS Detector Mover LUSI XCS Large Angle Detector Mover Engineering Specification", Apr. 2009.

Lindemann, Hendrik, "Entwicklung eines Postioniersystems für ein Absorptionselement im Hochvakuum", Masterarbeit, Jan. 2018.

Bu, Z. et al., "A small-Angle X-ray Scattering Apparatus for Studying Biological Macromoleculesin Solution", Journal of Applied Chrystallography, Vo. 31, No. 4, Aug. 1998.

Bruker Axs GmbH "NANOGRAPHY—Two Dimensional Scanning SAXS With the NANOSTAR in Lab Report XRD 43", 2010.

Goergl, R. and Maier, G A., "2GI-SAXS with NANOSTAR—a Synchrotron Method in the Lab in Lab Report XRD 62", 2015.

Maier, G. and Bruegemann, L., "High Temperature in-situ GI-SAXS on W/C multilayer coatings in NANOSTAR in Lab Report XRD 69", 2015.

"Geneva drive or Maltese cross" in Wikipedia, "https://en.wikipedia.org/w/index.php?title=Special: ElectronPdf&page=Geneva+drive &action=show-download-screen", retrieved: Jun. 17, 2010.

Lindemann, H., "Entwicklung eines Positioniersystems für ein Absorptionselement im Hochvakuum", Hamburg University of Applied Sciences, Faculty of Engineering and Computer Science. 2018.

* cited by examiner

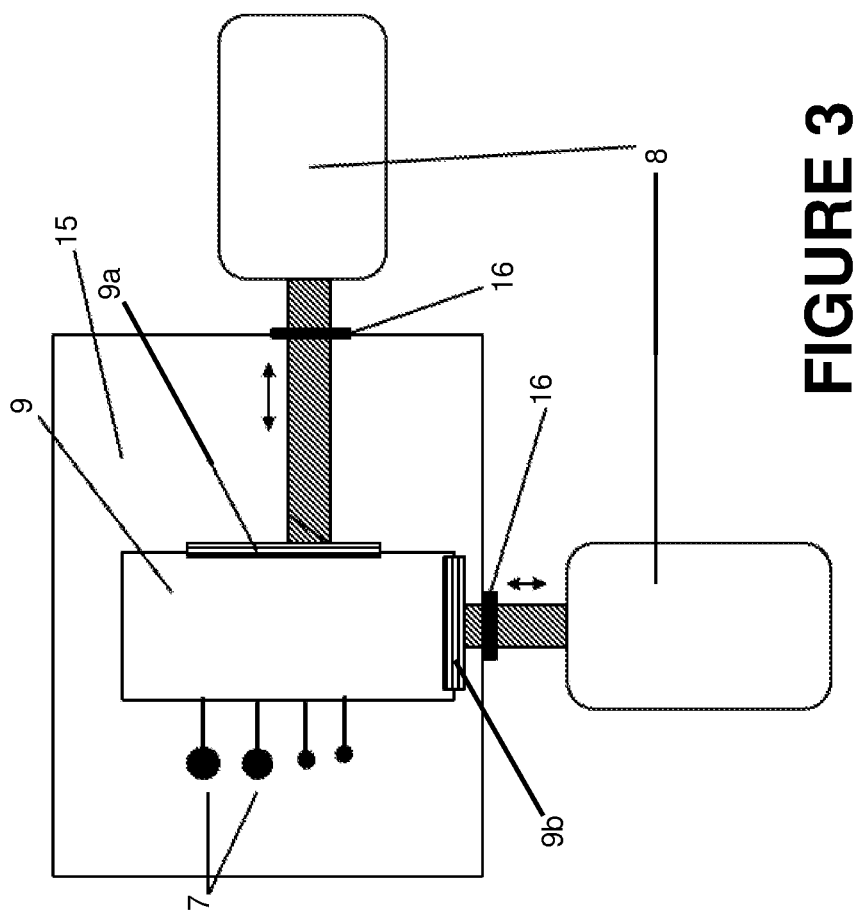

DEVICE FOR ADJUSTING AND EXCHANGING BEAMSTOPS

BACKGROUND OF THE INVENTION

Field of the Invention

The present invention relates in general to the field of x-ray-optical systems, especially beamstop arrangements for the primary x-ray beam. A conventional beamstop arrangement of the type in question is known, for example, from U.S. Pat. No. 7,295,650 B2.

Description of the Related Art

X-ray-optical methods are used for studying the properties, for example, material properties, of samples. A bundled x-ray or neutron beam is guided for this purpose onto the sample, where it interacts with the sample in manifold ways, in particular by scattering, diffraction, and reflection in the case of grazing incidence. The diffracted x-ray radiation after the interaction process is registered by an x-ray detector and subsequently analyzed to infer properties of the sample.

In many of these methods, only a small part of the primary x-ray radiation from an x-ray source is subject to a diffraction or scattering. By far the largest part of the radiation passes the sample undeflected. The undeflected part of the radiation is referred to as the primary beam, both before and also after the sample. In general, detectors for registering diffracted or scattered radiation have to be protected from the direct effect of the primary beam to avoid irreversible damage to the detector. Beamstops are used for this purpose, which largely shade the detector in order to prevent a damaging incidence of primary radiation. A beamstop can also shade interfering divergent parasitic radiation.

A beamstop of the known prior art can consist, for example, of a small plate made of gold or lead or an alloy made of highly-absorbent elements, which is fixed by Kapton threads in a steel ring. The position of the gold plate in a ring plane (xy plane) can be adjusted via two micrometer screws. The steel ring is flanged onto the detector.

The profile of the primary beam, in particular its diameter, is dependent on various influencing factors. On the one hand, the components used, such as apertures or beam optical units have certain finite manufacturing tolerances. On the other hand, there are also time-variable properties of the beam optical unit, such as temperature influences, deterioration, or variable experimental setups.

To be able to protect the detector sufficiently reliably from the primary beam under these circumstances, a relatively large beamstop has to be used, which also shades a part of the radiation incident in the range of the so-called small angle scattering (approximately 0.05° and 14°, in particular between 0.1° and 5° beam deflection), whereby items of information about the sample can be lost. Alternatively, it is possible to adapt the beamstop iteratively to a given beam optical unit. In this case, however, variable properties of the beam optical units cannot be corrected.

In most x-ray diffraction systems, also in SAXS (Small Angle X-ray Scattering) systems, having 1D or 2D detectors, direct beamstops are used to prevent the direct primary x-ray beam, which is partially diffracted/scattered by the sample, from striking the detector. In particular in SAXS systems, the detector region overlaps with the primary beam, since sample scattered signal is to be measured in the immediate vicinity of the primary beam. The beamstop prevents the detector from being saturated or destroyed or other negative influences of the measuring signal from taking place in the detector.

Especially in SAXS systems, the beam path is evacuated so as not to interfere with or corrupt the weak SAXS signal of the sample due to air scattering signals. The beamstop is also located in the vacuum between the primary beam and the detector (directly in front of the sensitive detector surface).

Modern SAXS devices, such as the "NANOSTAR" of the applicant, have one or more adjustable apertures having different openings in the primary beam path (primary beam before the sample). The size of the x-ray beam can thus be adapted to the sample or the necessary requirements (for example, resolution). It is accordingly necessary to adapt the beamstop to the size of the direct beam at the detector location. A set of pinhole apertures of different sizes is therefore provided, which can preferably be exchanged automatically. A direct beamstop having adapted size is necessary for every pinhole aperture combination, so that preferably the entire direct beam is shielded and scattering signal measurements down to ultrasmall angles are still enabled simultaneously.

In addition, every beamstop has to be able to be positioned precisely in the primary beam. The goal is to absorb as much intensity as possible of the direct beam using the beamstop and simultaneously to permit scattering signal measurements down to ultrasmall angles for every primary beam-pinhole aperture combination.

In the current NANOSTAR, the stated problem is solved as follows: The beamstop is suspended on two thin Kapton threads, which are aligned perpendicularly to one another. For this purpose, the beamstop is pierced and the threads are pulled through and adhesively bonded. The threads are tensioned at one end using springs. A setting unit is at the other end of the respective thread, so that the beamstop is positioned at the desired position in front of the detector. By tensioning or relaxing the threads, the beamstop can be moved in a small range along the thread directions and can thus be positioned precisely in the beam direction.

However, this type of the arrangement has the disadvantage that the beamstop can only have a predetermined size. If one wishes to widen the primary beam, for example, by a corresponding aperture setting, one thus does not then have the option of selecting a beamstop in another size.

In U.S. Pat. No. 7,295,650 B2, a beamstop for x-ray diffractometers is described, which is displaceable along the beam path (i.e., in the z-direction). A beamstop is provided between the sample and the detector, the cross-sectional shape of which is adapted, perpendicularly to the z-direction, to the cross section of the primary beam. The beamstop is arranged displaceably along the z-direction for optimum setting of the ratio of the useful radiation reaching the detector to the interfering radiation. This beamstop has only limited suitability for the use in the vacuum of a SAXS device. The beamstop also has only one predetermined size here in each case.

SUMMARY OF THE INVENTION

The invention relates to a beamstop arrangement for an x-ray optical system having at least one beamstop, which is adjustable in an xy plane perpendicular to a z-direction, for optimum setting of the ratio of useful radiation reaching a surface to interfering radiation of an x-ray beam in the z-direction.

The present invention provides a beamstop arrangement of the type defined at the outset, in which a positioning and exchanging system for multiple beamstops (of different sizes) is provided, which can be automatically adjusted in vacuum and whereby an exchange of the beamstops of various sizes is enabled. The drive motors are to be positioned outside the vacuum, however, so that the technical requirements for the motors are kept low.

The beamstop arrangement comprises a plurality of beamstops of differing size and/or geometry, which are arranged on an exchanging mount, which is installed on a carriage displaceable in the xy plane by means of a drive unit having two positioning motors.

One of the features of the present invention is that the primary beam path, i.e., the x-ray beam before the measurement sample, can be varied, which is accompanied by the feature that adaptable beamstops of different sizes accordingly have to be introduced in front of the detector. The present invention thus relates to an automatable exchanging device for beamstops, which is arranged in the vacuum region, while the positioning motors are each arranged outside the vacuum at room pressure.

In particular the following further advantages are achieved by the present invention: 1) the beamstops of different sizes can be reproducibly exchanged very precisely; 2) the beamstops can be displaced in two directions, which are perpendicular to the gearing axis (perpendicular to the direct beam direction) and can be aligned precisely on the primary beam; 3) all drive motors are located outside the vacuum and therefore vacuum-capable motors are not required; and 4) no electronic components are required in the vacuum.

The intentional shading of the primary beam by the beamstop arrangement according to the invention is effectuated by means of partial absorption or dimming of the x-ray beam with the aid of material opaque or at least only partially transmissive to x-ray radiation.

A beamstop having a partially transmissive material offers the possibility of re-measuring the beam strength of the source, since proceeding from the beam intensity on the detector, it can be back calculated which intensity originates from the x-ray source, a beam quality control is thus effectively enabled.

The beamstop according to the invention is thus constructed from a material which strongly absorbs the radiation, in particular from Au and/or Sb and/or Pb and/or W and/or Bi and/or Ta and/or Pt and/or Ir. The beamstop can thus be formed relatively thin and light, which facilitates its adjustment.

One preferred embodiment provides that to position a respective selected beamstop in the beam path of the x-ray-optical system, a drive having a positioning motor, preferably a DC motor, is provided, and that the carriage having the exchanging mount is linearly displaceable both in the x-direction and also in the y-direction. Not only the diameter, but also the position of the shadow of the beamstop in the detector plane can thus be set. Due to the motorized movability of the beamstop, the adjustment can be carried out in a mechanized and easily automatable manner and with high precision.

The movable exchanging mount is located in this case on a compound slide, which is translationally displaceable in the x- and y-directions (i.e., in parallel to the detector plane and perpendicular to the z-axis), wherein the z-direction is the direction of the direct beam (perpendicular to the detector plane). The selected beamstop can thus be adapted to the position of the direct beam. The carriage and the movable exchanging mount are located inside the vacuum housing, while the positioning motors ($\phi$, X and Y adjustment) are attached at ambient pressure outside on the housing. The positioning elements (tappets) of the positioning motors transmit the movement into the interior of the vacuum housing and displace the carriage located therein. The tappets are sealed off in relation to the ambient pressure using externally installable seals.

Furthermore, an embodiment is advantageous in which the beamstop has a round, preferably circular, cross-sectional shape. In general, the cross sections of the primary beam and the parasitic scattered radiation are also round, so that in this case the beamstop is adapted in its cross-sectional shape to the general case. However, the beamstop can also have a shape similar to a truncated cone. The cone axis is aligned on the beam axis in this case, and the wider truncated cone side faces toward the source or the sample, respectively. In this case, the edge of the wide truncated cone side defines a sharp boundary of the shaded region in the beam path. Interactions of radiation with the cone lateral surface are largely precluded or can be assumed to be minor.

In preferred embodiments of the invention, a lock mechanism is provided for high-precision establishment of a selected position of the exchanging mount. A DC motor is sufficient for the drive of the lock mechanism.

The differently dimensioned beamstops are preferably located on a rotatable exchanging carrier. The selected beamstop is guided into the beam path by rotating the carrier by a defined angle $\phi$.

One particularly advantageous class of embodiments of the beamstop arrangement according to the invention therefore provides that the exchanging mount comprises a rotatable carrier wheel, on the circumference of which multiple beamstops each of different size and/or geometry are arranged. The rotation of the carrier wheel can be implemented by a stepping gear.

Refinements of this class of embodiments are advantageous in which a Maltese cross gearing preferably having a DC electric motor is provided to drive the carrier wheel, since a precise angle setting is obtained using the Maltese cross gearing when the drive motor performs a revolution of the gearing.

These refinements can also be improved in that the Maltese cross gearing is additionally driven via a coupling having a radial offset, preferably a compound slide coupling or a universal joint.

A refinement of this class of embodiments is particularly advantageous in which a gear drive having lock positions and preferably a DC electric motor is provided to drive the carrier wheel. It is additionally advantageous to use a play-free gear drive, however, this gearing does not necessarily have to be free of play, since the function of the freedom from play is ensured by the lock position. A play-free gear drive would be significantly more complex and costly here.

In variants of the beamstop arrangement according to the invention refined alternatively to the above-described class of embodiments, the exchanging mount comprises a belt or chain device which can be pretensioned, and on which the beamstops are installed. A lock wheel for the drive is preferably provided here, whereby the angle position can be fixed. This embodiment is also advantageous in that due to the spring pre-tension of the tensioning wheel, the belt or chain can always be held at tension when the positioning motors align the carriage. A cross slot coupling is not required, since the drive wheel is not located on the carriage. A finer adjustment of the beamstops can be enabled by a corresponding transmission ratio from the drive wheel, which is driven by a servo motor, to the beamstop carrier wheel.

In any case, it is to be ensured that the positioning motors for the drive of the beamstop arrangement according to the invention are positioned outside the vacuum and the beamstops are arranged in the beam path, i.e., in the vacuum. This is because the (stepping) motors used generate heat in operation, so that an arrangement in a vacuum would have a negative effect on the sensitive SAXS measurement.

Embodiments of the invention are therefore advantageous, which are distinguished in that the carriage having the exchanging mount is arranged in a vacuum and the positioning motors of the drive unit are arranged in a region at ambient pressure, and that the positioning motors transmit the drive movement of the carriage via positioning elements, in particular tappets, from the ambient pressure region into the vacuum, wherein the positioning elements are sealed off using seals, which are preferably externally installable, at the transition region from ambient pressure to vacuum.

If the above-described stepping gear is replaced by a motor installed in the vacuum, in principle a drive can be omitted. However, the rotation then has to be very precise. This could be implemented, for example, by a piezoelectric motor. The translational movement then still required could then also be driven by a motor installed in the vacuum.

An x-ray-optical system is also within the scope of the present invention, in particular an x-ray diffractometer, having an x-ray source, from which x-ray radiation is guided as a primary beam onto a sample to be studied, having an x-ray detector for receiving x-ray radiation diffracted or scattered at the sample, wherein the x-ray source, the sample, and the x-ray detector are arranged on a z-axis, and wherein a beamstop of the above-described type according to the invention is provided between the sample and the x-ray detector.

In one particularly preferred embodiment, the system according to the invention is configured for measuring small angle scattering, in particular between 0.05° and 14°, preferably between 0.1° and 5°. In this case, an accurate suppression of the interfering radiation of primary beam and divergent parasitic radiation is particularly advantageous to ensure the greatest possible information content of the detected useful radiation, because the useful radiation in small angle scattering experiments is predominantly radiation diffracted close to the beam.

Particularly advantageous variants of the x-ray-optical system are distinguished in that the beamstop arrangement is positioned on the z-axis directly in front of the x-ray detector.

Furthermore, it is advantageous if an alignment device is provided, using which the positioning motors of the beamstop arrangement can position the respective selected beamstop in the x-ray beam.

An analysis unit is preferably provided in the x-ray-optical system according to the invention, using which the intensity of the x-ray radiation incident on a selected detector surface of the x-ray detector at a defined position of the selected beamstop of the beamstop arrangement can be analyzed. The system is thus automatically adjustable according to pre-definable criteria. In particular, the automatic adjustment can be carried out after every change of the experimental setup or before every measurement. The measurements are then carried out under optimum conditions. Typical criteria are, for example, falling below a certain upper limiting power of radiation at the detector.

Embodiments of the x-ray-optical system are also preferred which are distinguished in that multiple adjustable apertures having different openings are arranged in the primary beam path in front of the sample.

Furthermore, an embodiment of the system according to the invention is advantageous, in which the surface of the beamstop facing toward the incident beam is shaped concavely. The radiation is then incident approximately perpendicularly on the surface of the beamstop, and a high absorption of the radiation is achieved.

Another preferred embodiment provides that the detector is a single-element detector (zero-dimensional detector), which can travel a defined angular range around an axis perpendicular to the z-axis. Single-element detectors are particularly cost-effective and reliable.

In an alternative embodiment, the detector is a one-dimensional detector. An increase of the measuring speed when measuring an angle or solid angle range can be achieved thereby.

Even greater measuring speeds when measuring a solid angle range are achieved in a further particularly preferred alternative embodiment, which is characterized in that the detector is a two-dimensional surface detector, wherein the detector surface is arranged substantially perpendicular to the z-direction. Surface detectors are particularly sensitive.

The above-described embodiments, variants, and refinements of the invention have, inter alia, the following advantages:

Multiple very simply constructed and stable beamstop parts can be inserted into the beam path.

The beamstops can be reproducibly introduced into the x-ray beam and exchanged very accurately.

The beamstop can be displaced by a motor in two directions perpendicular to the x-ray beam axis.

Self-centering can be carried out by the motorization. For example, the centering is carried out with the aid of the detector, wherein the carriage having the corresponding selected beamstop is moved into the beam in the xy plane until a minimum is measured on a detector region. This minimum is an indication of maximum shading of the direct beam, so that the corona, if provided, is recognizable as symmetrically as possible around the beamstop.

An X/Y parameter set can be stored for every beamstop in the software. The installation accuracy of the beamstop parts can thus be low during the installation and/or an exchange.

All drive motors are located outside the vacuum. The motors thus do not have to fulfill any special vacuum requirements. The cooling of the motors is better and the introduction of heat of the motors to the mechanism is less. Thermal effects on the positioning are thus less.

There are no cables and/or electronic components in the vacuum which might worsen the vacuum due to outgassing, or which would have to be vacuum-compatible.

Further advantages of the invention will be apparent from the description and the drawings. The above-mentioned features and the features explained hereafter can also each be used individually as such or in multiples in arbitrary combinations according to the invention. The embodiments shown and described are not to be understood as an exhaustive list, but rather have exemplary character for the description of the invention.

BRIEF DESCRIPTION OF THE DRAWINGS

The invention is illustrated in the drawing and will be explained in greater detail on the basis of exemplary embodiments.

In the figures:

FIG. 3 shows an embodiment of the beamstop arrangement according to the invention having linear slide guides for translational XY displacements of the exchanging mount in schematic vertical section;

FIG. 6b shows a 2:1 enlargement of the image section having the compound slide coupling of FIG. 6a.

DETAILED DESCRIPTION

Figure 1:
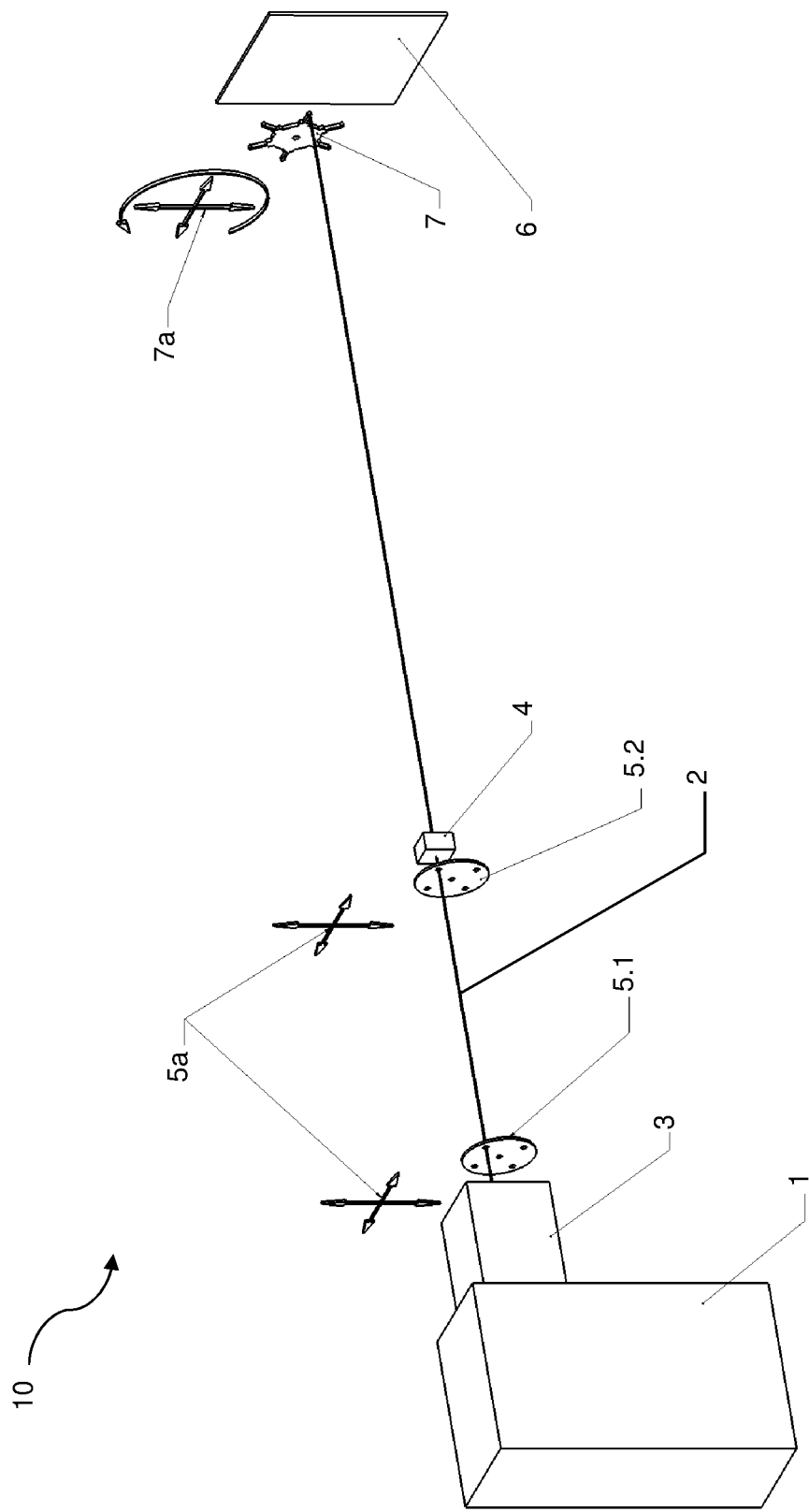
FIG. 1 shows a schematic three-dimensional illustration of an embodiment of the x-ray-optical system according to the invention having a beamstop arrangement having many beamstops of differing size and/or geometry on an exchanging mount.
Figure 2A:
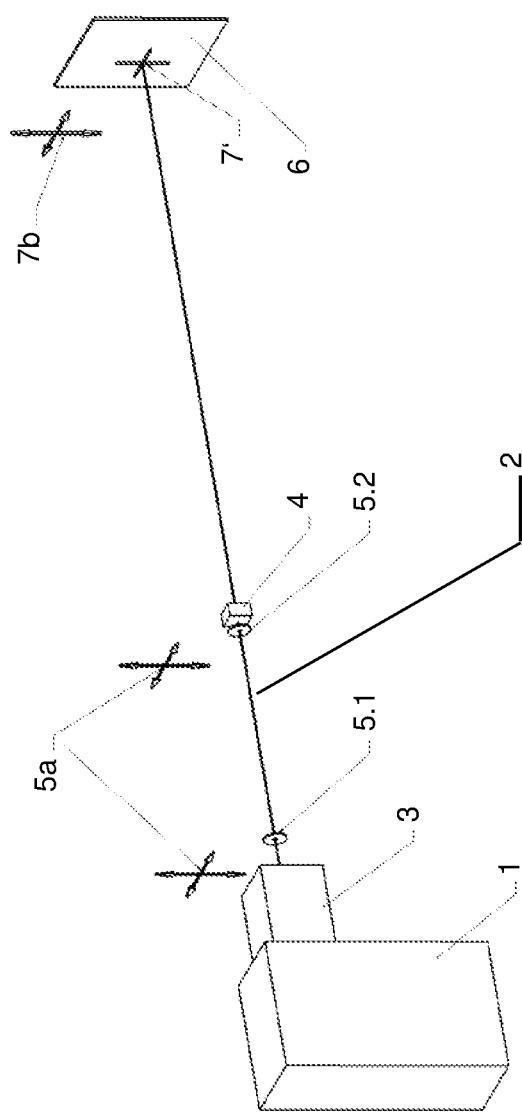
FIG. 2a shows an x-ray-optical system according to one example of the prior art in a schematic three-dimensional illustration.
Figure 2B:
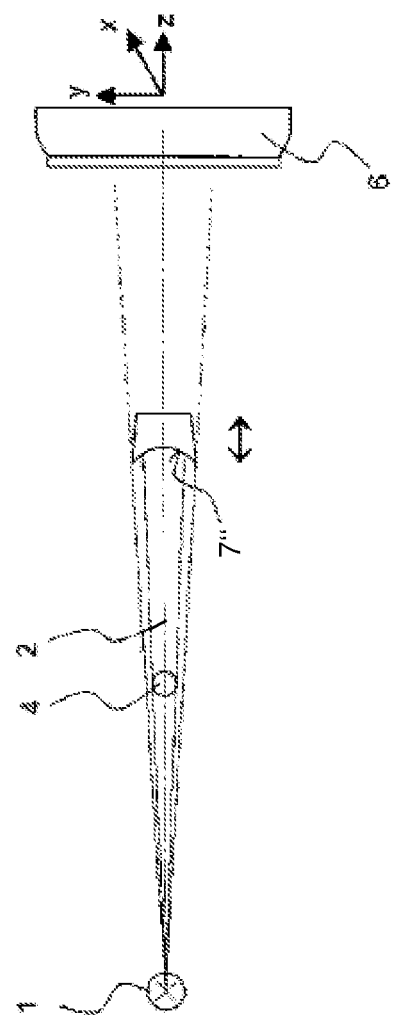
FIG. 2b shows an x-ray-optical system according to another example of the prior art in schematic vertical section.

FIGS. 1 and 3 to 6b each show a schematic view in differing detail of preferred embodiments of the beamstop arrangement according to the invention for an x-ray-optical system 10, while FIGS. 2a and 2b each show a generic x-ray-optical system according to the prior art, with FIG. 2a being representative of the applicant's NANOSTAR system, and FIG. 2b being representative of the system shown in U.S. Pat. No. 7,295,650.

The x-ray-optical system shown in FIG. 2a comprises an x-ray source 1 having upstream source optical unit 3 for forming the primary x-ray beam 2. This is followed in the beam direction by a first aperture 5.1 and a second aperture 5.2, which are arranged for further beamforming even before the sample 4 to be measured in the primary beam 2, and which have the translational degrees of freedom 5a indicated as arrow crosses shown in the figure.

After the sample 4, a beamstop 7' adjustable in an xy plane perpendicular to a z direction is arranged directly before the sensitive surface of an x-ray detector 6, which is used for the optimum setting of the ratio of useful radiation reaching the sensitive surface to the interfering radiation of the x-ray beam 2 in the z-direction. The degrees of freedom 7b of the beamstop 7' for displacement in the x- and y-directions are again indicated as an arrow cross.

The x-ray-optical system shown in FIG. 2b has a beamstop arrangement according to U.S. Pat. No. 7,295,650. The beamstop 7" only has one single translational degree of freedom, in that it is movable forward and back in the z-direction on the z-axis, which is the beam axis, and is indicated in the figure by a double-headed arrow.

The present invention improves on these arrangements in several ways. The beamstop arrangement according to the invention comprises a plurality of beamstops 7 of differing size and/or geometry, which are arranged on an exchanging mount and have both translational and also rotational degrees of freedom 7a, as shown in FIG. 1.

Alternatively, the beamstops 7 can be attached to a mount which can be moved solely translationally in the XY direction by means of positioning motors. To exchange the different beamstops, a positioning motor would then take a longer path to position the individual beamstops in the beam path in such a way that the adjacent beamstops do not shade the detector surface. The beamstops then have to be arranged at a greater distance. Alternatively, the beamstops on the mount could be reduced to a smaller number, for example, three.

As shown in the embodiment of FIG. 3, the exchanging mount can be installed on a carriage 9, which is displaceable by means of a drive unit having at least one positioning motor 8; 8'; 8" in the xy plane both in the x direction and also in the y direction. The carriage 9 is moved on slide rails 9a, 9b and is arranged having the exchanging mount in a vacuum region 15, while the positioning motors 8 of the drive unit are located in a region of ambient pressure. The positioning motors 8 transmit the drive movement of the carriage 9 via positioning elements—indicated with dark shading in the drawing—in particular tappets, from the room pressure region into the vacuum region 15, wherein the positioning elements are sealed using vacuum seals 16, which are preferably externally installable, on the transition region from ambient pressure to the vacuum region 15.

Figure 4:
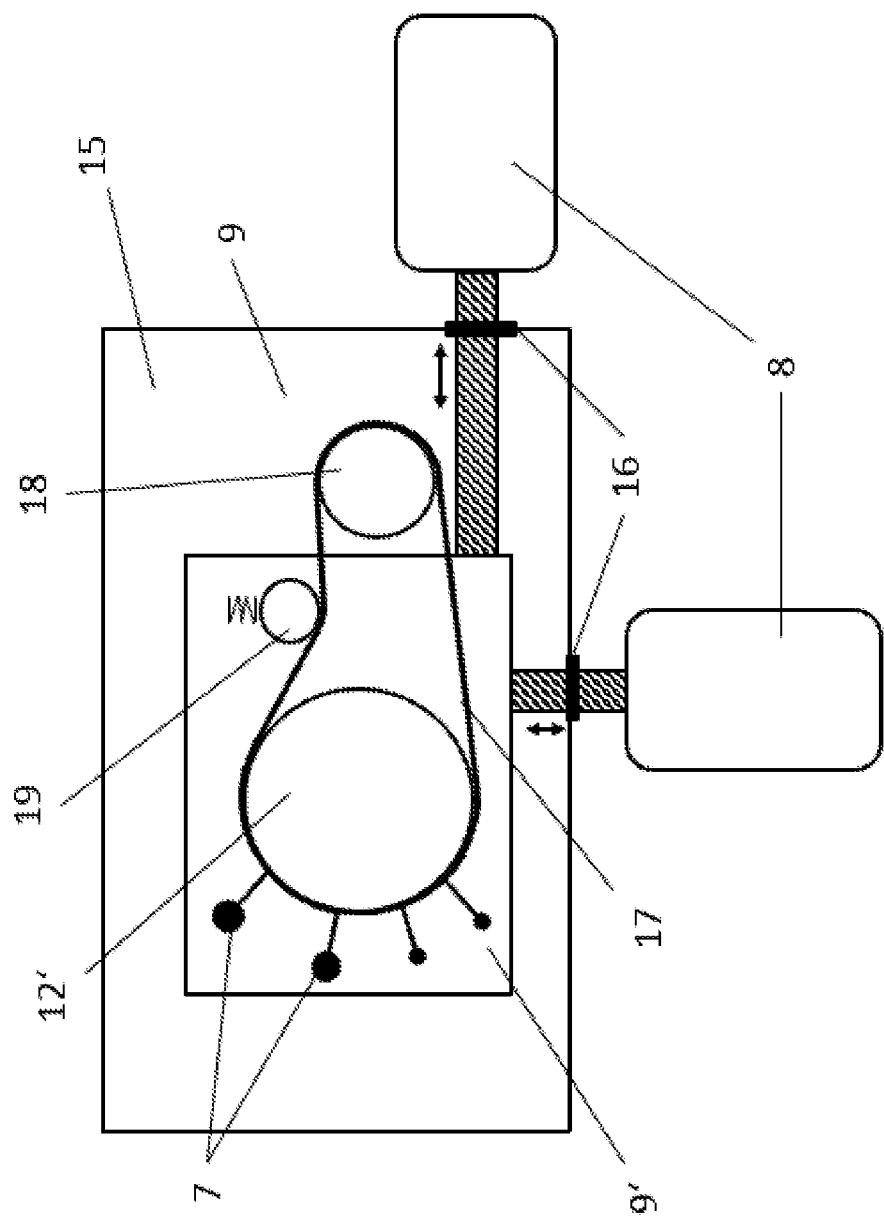
FIG. 4 shows an embodiment of the beamstop arrangement according to the invention having an exchanging mount driven via a belt or a chain in schematic vertical section.

In the embodiment according to FIG. 4, the carriage having the exchanging mount is embodied as a compound slide 9'. The exchanging mount comprises here a belt or chain device 17, which can be pretensioned, and on which the beamstops 7 of respectively differing size and/or geometry are installed. In this embodiment, the drive is performed by a belt or chain device 17, which can be pretensioned, and which is driven by means of a drive wheel 18 and is guided via a carrier wheel 12'. This embodiment also has the advantage that due to the spring pre-tension of the tensioning wheel 19, the belt or chain can always be kept at tension when the positioning motors 8 align the slide 9'. A coupling having radial offset is not required if the drive wheel 18 is not located on the slide 9'.

Figure 5:
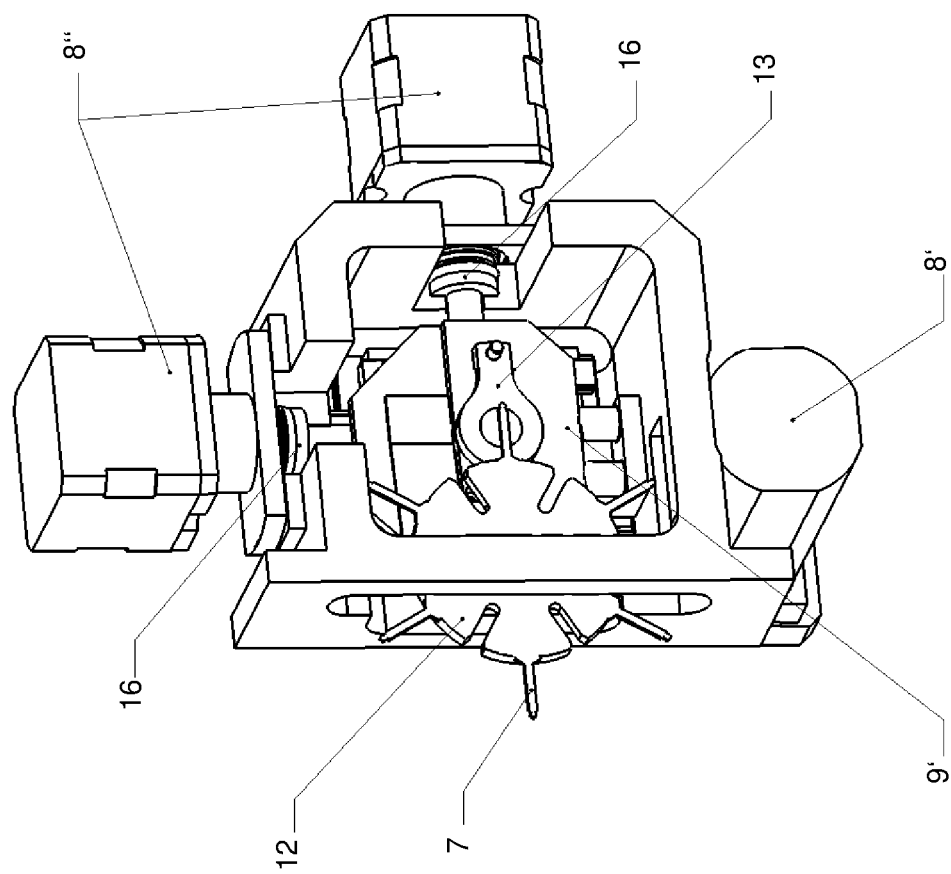
FIG. 5 shows an embodiment of the beamstop arrangement according to the invention having lockable carrier wheel and exchanging mount driven via a stepping gear having compound slides in a schematic three-dimensional illustration.

FIG. 5 shows an embodiment of the beamstop arrangement according to the invention, in which the transmission of the movement from the positioning motors 8 to the exchanging mount takes place via a stepping gear 13, in particular a Maltese cross gearing preferably having a DC electric motor 8' for the rotational drive of the carrier wheel 12 and also two further motors 8" for the linear translational movements. The gearing 13 can additionally be driven via a coupling having radial offset, preferably a compound slide coupling 14 or a universal joint.

Figure 6A:
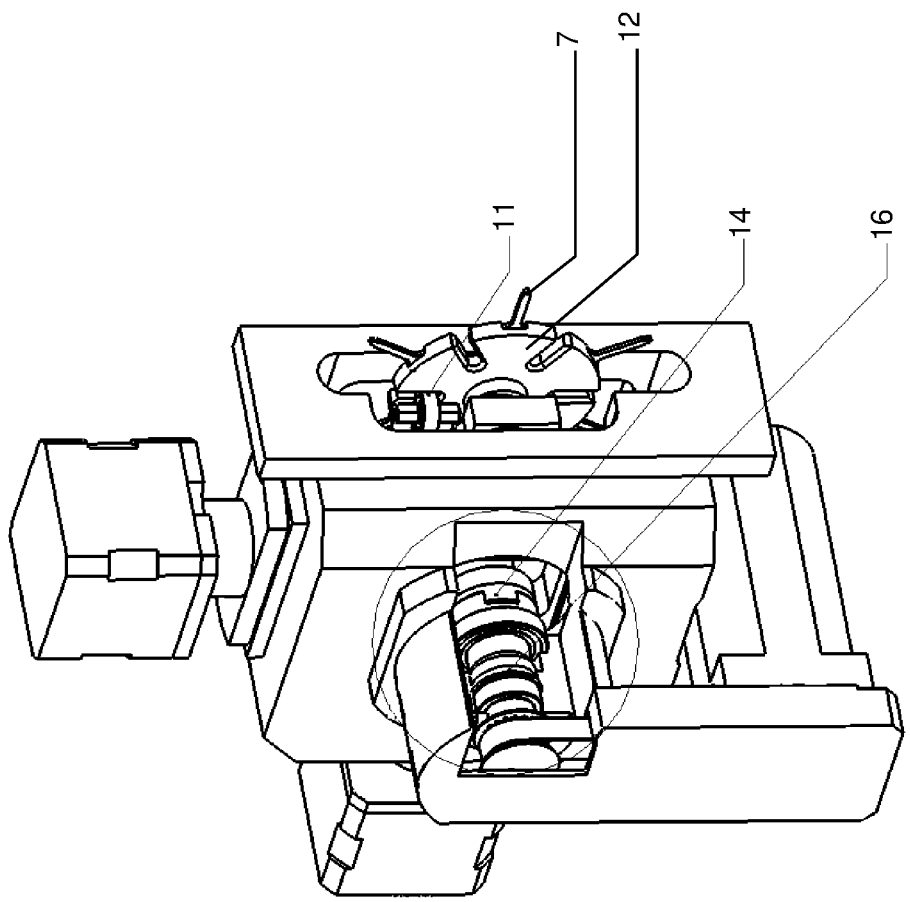
FIG. 6a shows the embodiment of FIG. 5 having a compound slide coupling in a schematic, partially cutaway three-dimensional illustration rotated by 90°.
Figure 6B:
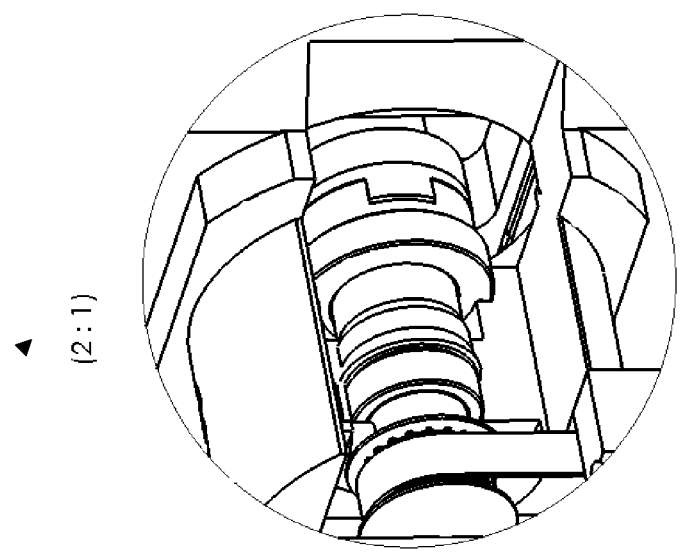

In FIG. 6a, the embodiment according to FIG. 5 is shown pivoted by 90° around a vertical axis. A lock mechanism 11 for fixing a selected position of the exchanging mount and details of the compound slide coupling 14 are also apparent, which is also shown enlarged by a factor of two in FIG. 6b.

One difficulty which results in the case of the drive of the rotatable carrier via a Maltese cross gearing 13 is that upon displacement of the carriage 9, the axis of rotation of the drive is also displaced. A coupling is therefore to be used here which permits a radial offset, for example, the above-described compound slide coupling 14 (for example, in the form of a so-called Oldham coupling).

Compound slide couplings have the advantage of conformal transmission and a compact construction. The use of a universal joint is also possible, but less preferable, since the angle transmission is not synchronous and moreover it requires a larger installation space. The drive axis can thus protrude into the vacuum housing and can be sealed off in relation to the ambient pressure using a corresponding seal. This drive axis transmits the rotational movement to the compound slide coupling and this in turn transmits it to the stepping gear, which moves the rotatable carrier.

The invention claimed is:

1. A beamstop arrangement for an x-ray optical system that is adjustable in an xy plane perpendicular to a z-direction for optimum setting of the ratio of useful radiation reaching a surface to interfering radiation of an x-ray beam in the z-direction, comprising:
   a plurality of beamstops of differing size and/or geometry, which are arranged on an exchanging mount having a rotatable carrier wheel on the circumference of which multiple beamstops each of differing size and/or geometry are arranged; and
   a carriage on which the exchanging mount is installed that is displaceable in the xy plane by means of a drive unit having at least two positioning motors.

2. The beamstop arrangement as claimed in claim 1, wherein the drive unit moves the carriage to position a selected beamstop in the beam path of the x-ray-optical system, the carriage being linearly displaceable with the exchanging mount both in the x-direction and the y-direction.

3. The beamstop arrangement as claimed in claim 2, wherein the drive unit comprises a stepping motor.

4. The beamstop arrangement as claimed in claim 1, wherein a lock mechanism is provided for fixing a selected position of the exchanging mount.

5. The beamstop arrangement as claimed in claim 1, wherein a DC electric motor for driving the carrier wheel is provided.

6. The beamstop arrangement as claimed in claim 1, wherein a Maltese cross gearing is provided.

7. The beamstop arrangement as claimed in claim 6, wherein the Maltese cross gearing is driven via a coupling having a radial offset.

8. The beamstop arrangement as claimed in claim 7, wherein the radial offset of the coupling is realized by a compound slide coupling or a universal joint.

9. The beamstop arrangement as claimed in claim 1, wherein a gear drive having lock positions is provided.

10. The beamstop arrangement as claimed in claim 1, wherein the exchanging mount comprises a belt or chain device, which can be pretensioned, and on which the beamstops are installed.

11. The beamstop arrangement as claimed in claim 1, wherein the carriage is arranged in a vacuum and the positioning motors of the drive unit are arranged in a region at ambient pressure, and wherein the positioning motors transmit drive movement of the carriage via positioning elements from the ambient pressure region into the vacuum, the positioning elements extending through vacuum seals between the ambient pressure region and the vacuum.

12. An x-ray-optical system comprising:
    an x-ray source from which x-ray radiation is guided as a primary beam onto a sample to be studied;
    an x-ray detector for receiving x-ray radiation diffracted or scattered at the sample; and
    a beamstop arrangement as claimed in claim 1 wherein the x-ray source, the sample, and the x-ray detector are arranged along the z-direction, and wherein the beamstop arrangement positions a selected one of said beamstops along the z-direction between the sample and the x-ray detector.

13. The x-ray-optical system as claimed in claim 12, wherein the x-ray-optical system is configured for measuring small angle scattering between 0.05° and 14°.

14. The x-ray-optical system as claimed in claim 12, wherein the beamstop arrangement is arranged on the z-axis directly in front of the x-ray detector.

15. The x-ray-optical system as claimed in claim 12, further comprising an alignment device used by the positioning motors of the beamstop arrangement to position the selected beamstop in the x-ray beam.

16. The x-ray-optical system as claimed in claim 12, further comprising an analysis unit that determines an intensity of the x-ray radiation incident on a selected detector surface of the x-ray detector relative to a defined position of the selected beamstop of the beamstop arrangement.

17. The x-ray-optical system as claimed in claim 12, further comprising multiple adjustable apertures having different openings that are arranged in a path of the primary beam in front of the sample.

* * * * *